United States Patent [19]

Shindo et al.

[11] Patent Number: 5,486,933
[45] Date of Patent: Jan. 23, 1996

[54] MONOCHROMATIC-LIGHT REPRODUCTION TYPE HOLOGRAM, AND METHOD AND APPARATUS FOR ITS IMAGE REPRODUCTION

[75] Inventors: Naoaki Shindo; Takehide Kita; Nagahisa Matsudaira; Akihiko Kobayashi; Yoshiaki Tada; Takashi Sato; Atsushi Sato, all of Tokyo, Japan

[73] Assignee: Toppan Printing Co., Ltd., Tokyo, Japan

[21] Appl. No.: 170,910

[22] Filed: Dec. 21, 1993

[30] Foreign Application Priority Data

Dec. 28, 1992 [JP] Japan .................................. 4-347733
Mar. 29, 1993 [JP] Japan .................................. 5-070560

[51] Int. Cl.⁶ .............................. G02B 5/32; G03H 1/28
[52] U.S. Cl. .............................. 359/2; 235/457; 283/86; 359/22; 359/24; 359/32
[58] Field of Search ............................ 359/22, 24, 25, 359/32, 33, 2; 283/86; 235/457

[56] References Cited

U.S. PATENT DOCUMENTS

| | | |
|---|---|---|
| 3,503,050 | 3/1970 | Schoois et al. |
| 4,037,919 | 7/1977 | Takeda et al. ............ 359/32 |
| 4,065,202 | 12/1977 | Kurtz ....................... 359/32 |
| 4,140,373 | 2/1979 | Rull. |
| 4,730,881 | 3/1988 | Taguchi et al. ............ 359/32 |
| 4,795,223 | 1/1989 | Moss ........................ 359/32 |
| 4,889,780 | 12/1989 | Cosner ..................... 359/32 |
| 5,121,229 | 6/1992 | Benton et al. ............ 359/32 |
| 5,293,259 | 3/1994 | Huang et al. ............ 359/32 |

FOREIGN PATENT DOCUMENTS

| | | |
|---|---|---|
| 0290333 | 11/1988 | European Pat. Off. |
| 2508889 | 9/1976 | Germany . |
| 3908300 | 9/1989 | Germany . |
| 3908307 | 10/1989 | Germany . |
| 88/05174 | 7/1988 | WIPO . |
| 92/04692 | 3/1992 | WIPO . |
| 92/09444 | 6/1992 | WIPO . |

OTHER PUBLICATIONS

IBM Technical Disclosure Bulletin, Apr. 11, 1966, C. Lanza, 8:1559–1560, Entitled: Display Device.
Journal of Physics E. Scientific Instruments, Aug. 1968, J. D. Redman, 1:821–822, Entitled: Novel Applications of Holography.

*Primary Examiner*—Martin Lerner
*Attorney, Agent, or Firm*—Armstrong, Westerman, Hattori, McLeland & Naughton

[57] ABSTRACT

A monochromatic-light reproduction type hologram having a hologram recorded area provided with interference fringes that form a hologram image, the hologram image being reproducible by irradiating the hologram recorded area with monochromatic light at a given angle. A plurality of hologram images different from each other in the directionality of interference fringes are multiple-recorded in the hologram recorded area. Alternatively, the hologram recorded area is divided into a plurality of regions so that a plurality of hologram images different from each other in the directionality of interference fringes are separately recorded in the divided regions. The recorded area is successively or simultaneously irradiated with monochromatic light rays at given angles corresponding to the directionality of interference fringes of the respective hologram images, to reproduce the hologram images as a plurality of information patterns or a single information pattern. The reproduced information pattern(s) can be utilized as identity information for judgment on whether or not an article is genuine, and also no more than a dead copy of part of the hologram image that constitutes a single information pattern can be produced even if laser light is made incident on the hologram recorded area from one direction, so that its forgery can be prevented.

1 Claim, 13 Drawing Sheets

FIG. 3
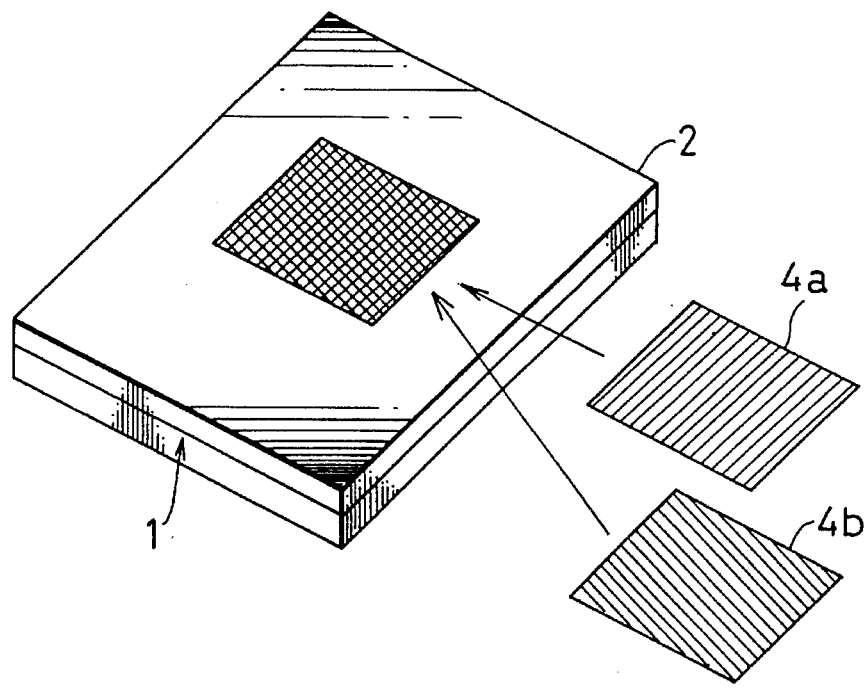
FIG. 4A
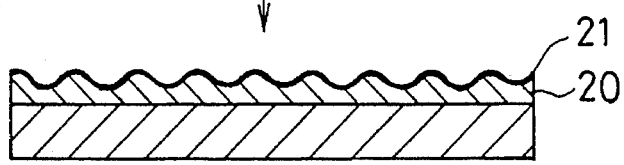
FIG. 4B
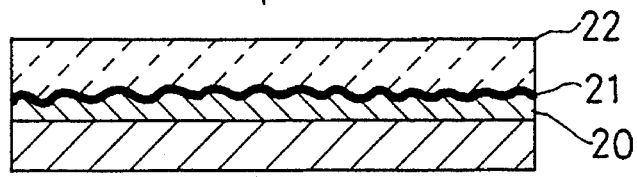
FIG. 4C
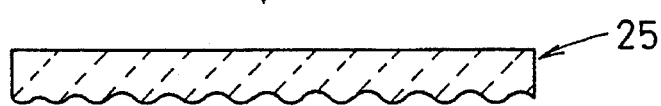
FIG. 4D MASK FOR DIVIDED PATTERN (A)   MASK FOR DIVIDED PATTERN (B)   MASK FOR DIVIDED PATTERN (C)

F I G. 2 1
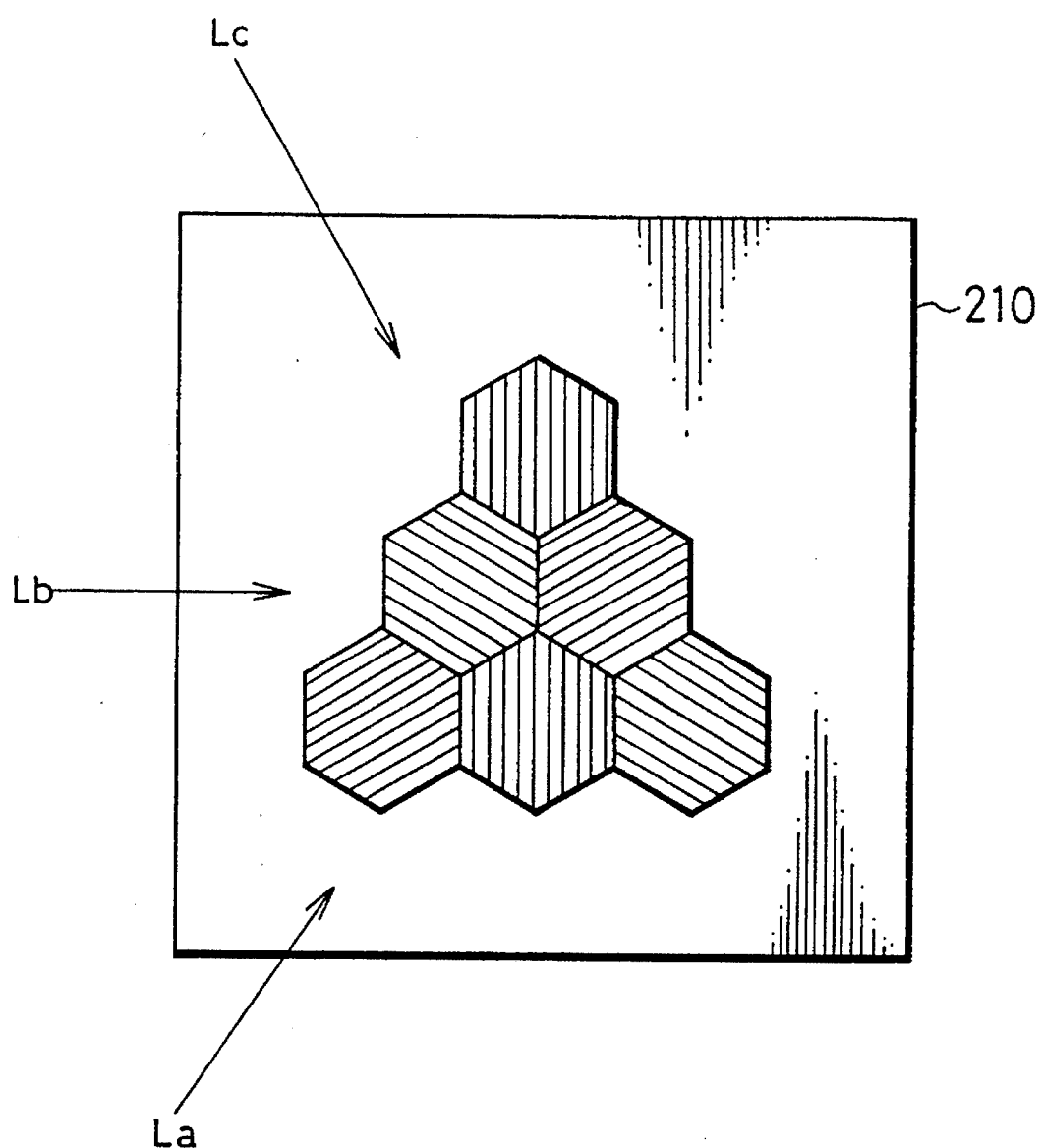

MONOCHROMATIC-LIGHT REPRODUCTION TYPE HOLOGRAM, AND METHOD AND APPARATUS FOR ITS IMAGE REPRODUCTION

BACKGROUND OF THE INVENTION

1. Field of the Invention

This invention relates to a monochromatic-light reproduction type hologram from which recorded information can be read by an optical means, and more particularly, to a monochromatic-light reproduction type hologram that is difficult to forge using a dead copy. It also relates to a method, and an apparatus, for its image reproduction.

2. Description of the Related Art

The monochromatic-light reproduction type hologram is a sort of recording medium provided on its surface with interference fringes that form a hologram image, where monochromatic light is incident on the hologram recorded area at a given angle to cause diffraction of waves from the hologram at a given angle to thereby reproduce the hologram image. Holograms of this type have been hitherto widely used for appreciation of display or the like. In recent years, there is an increase in holograms serving as identity mediums from which recorded information can be optically read. Herein, the hologram from which recorded information can be optically read (optically information-readable hologram) refers to a medium having the hologram recorded area in which a hologram image comprised of an information pattern intended to be read afterwards has been recorded.

As the information pattern, lettering patterns of characters, numerals, ABCs, etc. are commonly used, and hologram images comprised of such lettering patterns are formed and reproduced as images on an image forming surface of a ground glass or the like to visually recognize the recorded information.

As other information patterns, relatively simple identity marks such as bar codes and calra codes are also recently used, and holograms intended for the machine reading of hologram images comprised of such identity marks, by means of an optical sensor or the like (called machine-readable holograms) are proposed (see International Patent Publication WO92/04692).

These optically information-readable holograms are incorporated into cards, goods and so forth so as to be utilized as identity information for judgement on whether or not an article is genuine.

However, in conventional holograms of this type, the interference fringes that form the hologram image are set in a single directionality, and hence have had the problem that it is easy for persons having a knowledge of holograms to make a forgery using what is called a dead copy, which is to make a copy of an information pattern recorded in the hologram recorded area, on other photosensitive material by applying laser light to the recorded area of an original hologram.

SUMMARY OF THE INVENTION

The present invention addresses such problems. An object thereof is to provide a monochromatic-light reproduction type hologram that is difficult to forge using a dead copy.

Another object of the present invention is to provide a method of image reproduction from the monochromatic-light reproduction type hologram.

Still another object of the present invention is to provide an image reproducing apparatus suited for the method of image reproduction from the monochromatic-light reproduction type hologram.

To achieve the above objects, the present invention provides a monochromatic-light reproduction type hologram having a hologram recorded area provided with interference fringes that form a hologram image, said hologram image being reproducible by irradiating the hologram recorded area with monochromatic light at a given angle, wherein;

a plurality of hologram images different from each other in the directionality of interference fringes are recorded in said hologram recorded area.

The present invention also provides a method of reproducing a hologram image from a monochromatic-light reproduction type hologram having a hologram recorded area provided with interference fringes that form the hologram image, by irradiating the hologram recorded area with monochromatic light, wherein;

said hologram recorded area is an area in which a plurality of hologram images different from each other in the directionality of interference fringes are recorded, and said area is irradiated with monochromatic light rays at given angles corresponding to the directionality of interference fringes of the respective hologram images, to reproduce the individual hologram images as respectively independent information patterns or to simultaneously reproduce the respective hologram images to synthesize a single information pattern.

The present invention still also provides an apparatus for reproducing a hologram image from a monochromatic-light reproduction type hologram, comprising a holding means for setting a monochromatic-light reproduction type hologram recorded article at a given position; a plurality of monochromatic light irradiation means provided respectively at the upper part and the lower part of the holding means located between them and by which the hologram recorded area of the monochromatic-light reproduction type hologram recorded article set on the given position is irradiated with monochromatic light rays at given angles; said hologram recorded area being an area in which a plurality of hologram images different from each other in the directionality of interference fringes are recorded, and being irradiated with said monochromatic light rays at given angles corresponding to the directionality of interference fringes of the recorded respective hologram images; end an image forming means capable of forming the respective hologram images reproduced upon irradiation of the corresponding monochromatic light rays.

BRIEF DESCRIPTION OF THE DRAWINGS

FIG. 3 is a schematic illustration of a master on which a multiple recording has been made.

FIGS. 4A to 4D illustrate a process for producing a metal stamper by known electroforming making use of the master.

FIG. 21 illustrates a method of image reproduction from a hologram label according to the third embodiment of the present invention.

DESCRIPTION OF THE PREFERRED EMBODIMENTS

Figure 1:
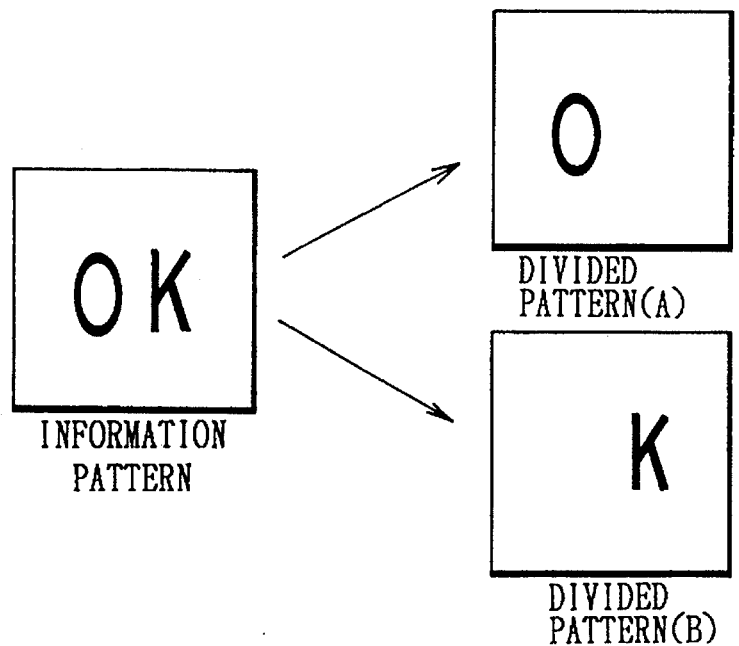
FIG. 1 illustrates the relationship between an information pattern and its divided patterns according to a first embodiment of the present invention.

The present invention will be described below in detail.

The monochromatic-light reproduction type hologram according to the present invention has a hologram recorded area provided with interference fringes that form a hologram image, the hologram image being reproducible by irradiating the hologram recorded area with monochromatic light at a given angle, and is characterized in that a plurality of hologram images different from each other in the directionality of interference fringes are recorded in the hologram recorded area.

As an embodiment according to which a plurality of hologram images are recorded in the hologram recorded area in the monochromatic-light reproduction type hologram, for example, a plurality of hologram images different from each other in the directionality of interference fringes may be multiple-recorded in the hologram recorded area. As another embodiment, the hologram recorded area may be divided into a plurality of regions so that a plurality of hologram images different from each other in the directionality of interference fringes can be separately recorded in the hologram recorded area divided into a plurality of regions, or on some occasions, a plurality of hologram images different from each other in the directionality of interference fringes may be multiple-recorded in the individual divided regions.

With regard to the plurality of hologram images recorded in the hologram recorded area, the respective hologram images may be individually reproduced to form respectively independent information patterns, or the respective hologram images may be simultaneously reproduced to form a single information pattern.

Since in the monochromatic-light reproduction type hologram according to the present invention the plurality of hologram images different from each other in the directionality of interference fringes are recorded in the hologram recorded area, no more than a dead copy of part of the hologram image that constitutes an information pattern can be produced even if laser light is made incident on the hologram recorded area from one direction, so that it becomes difficult to make a complete dead copy of the information pattern recorded in the hologram recorded area.

The monochromatic-light reproduction type hologram according to the present invention herein basically refers to a reflection type hologram or light transmission type hologram including those of a Fresnel type or a Fourier transform type. As an example thereof, a hologram commonly called a master hologram, which is made up on the first step in the process of making up a hologram of a known two-step type corresponds to this hologram. More specifically, even when white light is incident on a recorded area of this hologram called the master hologram, the image of an object photographed in the first step is not visible to the naked eye when reproduced. On the other hand, when a monochromatic light of a visible light laser or the like is incident thereon, the image of an object photographed in the first step becomes visible to the naked eye when reproduced.

This monochromatic-light reproduction type hologram may be comprised of a hologram having a decorative-purpose printed image at some part of the hologram recorded area in which the plurality of hologram images reproducible using monochromatic light are recorded, which is commonly called the print-integrated hologram, or may be comprised of a hologram having at some part thereof a hologram pattern reproducible using white light, which is commonly called the rainbow hologram, any of which may be employed.

As the information pattern utilized for judgement on whether or not an article is genuine, lettering patterns of, for example, letters or characters such as "OK", "TRUE" and "山", numerals and other ABCs, bar codes, and calra codes, which are relatively simple identity marks, are used for that purpose. When the system in which a plurality of hologram images are simultaneously reproduced to form a single information pattern (e.g., a lettering pattern of "OK", "TRUE" or the like) is employed, the patterns of the respective hologram images are comprised of divided patterns of the above information pattern, including two-divided patterns divided into "O"-and-"K" or "TR"-and-"UE" in the above example, or multi-divided patterns further divided into more parts.

As a method of reproducing the information pattern utilized for judgement on whether or not an article is genuine, the hologram recorded area in which the plurality of hologram images different from each other in the directionality of interference fringes are recorded may be successively or simultaneously irradiated with monochromatic light rays at given angles corresponding to the directionality of interference fringes of the respective hologram images.

Then, a plurality of information patterns individually recorded may be simultaneously or successively reproduced, or a plurality of divided patterns individually recorded may be simultaneously reproduced to synthesize a single information pattern, whereby the information pattern can be used as identity information to make a judgement on whether or not an article is genuine.

Here, when the monochromatic-light reproduction type hologram in which a plurality of divided patterns are recorded is set up as the light transmission type hologram, a hologram image reproduced using reflected diffracted light and a hologram image reproduced using transmitted diffracted light may be synthesized to reproduce a single information pattern.

The light source from which the hologram recorded area is irradiated with monochromatic light rays at given angles may be comprised of a plurality of light sources corresponding with the number of sets of the monochromatic light rays shed correspondingly to the directionality of interference fringes, or may be comprised of one light source from which the corresponding plural sets of the monochromatic light rays are obtained using mirrors, any of which may be employed.

In the present image reproducing apparatus, a plurality of monochromatic light irradiation means are provided respectively at the upper part and the lower part of a holding means for setting the monochromatic-light reproduction type hologram recorded article at a given position, located between them. Hence, the monochromatic light irradiation means provided at the upper part or the lower part of the monochromatic-light reproduction type hologram recorded article set between them can be selectively operated irrespective of whether the monochromatic-light reproduction type hologram is comprised of a reflection type hologram or comprised of a light transmission type hologram. Thus, the information patterns recorded in the hologram recorded area can be respectively reproduced.

The monochromatic-light reproduction type hologram according to the present invention can be incorporated into articles as exemplified by marketable securities such as stock certificates, checks, stamps, postage stamps, bills, bonds, bankbooks, tickets, commutation tickets and theater tickets; commercial cards such as cash cards, credit cards, telephone cards, IC cards and optical cards; ID cards such as membership cards and identifications; passports and coupon tickets; and certificates, written expert opinions, lottery tickets, and unfairness preventive seals which tend to be forged.

As described above, according to the present invention, a plurality of hologram images different from each other in the directionality of interference fringes are recorded in the hologram recorded area of a monochromatic-light reproduction type hologram from which the hologram image can be reproduced by irradiation with monochromatic light. Hence, no more than a dead copy of part of the hologram image that constitutes an information pattern can be produced even if laser light is made incident on the hologram recorded area from one direction. Thus, the present invention is effective for surely preventing the forgery that may be made using a dead copy.

In the method of image reproduction from the above hologram, the above hologram recorded area of the monochromatic-light reproduction type hologram is successively or simultaneously irradiated with monochromatic light rays at given angles corresponding to the directionality of interference fringes of the respective hologram images so that a plurality of information patterns individually recorded therein can be successively or simultaneously reproduced or a plurality of divided patterns individually recorded can be simultaneously reproduced to synthesize a single information pattern. Thus, the present invention is also effective for making judgement on whether or not an article is genuine, using the information pattern as identity information.

In the image reproducing apparatus used in the method of image reproduction from the monochromatic-light reproduction type hologram, a plurality of monochromatic light irradiation means are provided respectively at the upper part and the lower part of a holding means for setting the monochromatic-light reproduction type hologram recorded article at a given position, located between them. Hence, the monochromatic light irradiation means provided at the upper part or the lower part of the monochromatic-light reproduction type hologram recorded article set between them can be selectively operated irrespective of whether the monochromatic-light reproduction type hologram is comprised of a reflection type hologram or comprised of a light transmission type hologram. Thus, the present invention is also effective for respectively reproducing the information patterns recorded in the hologram recorded area.

Specific embodiments of the present invention will be described below with reference to the accompanying drawings.

FIRST EMBODIMENT

Preparation of master

A master serving as an original plate for a metal stamper used to prepare the hologram is produced in the following way.

FIG. 1 diagrammatically illustrates the relationship between a single information pattern (comprised of letters "OK") and its divided patterns. In the present embodiment, the information pattern is divided into two patterns A and B to produce transmission-type originals. The information pattern may be formed of either a halftone dot image or a continuous tone image.

Figure 2:
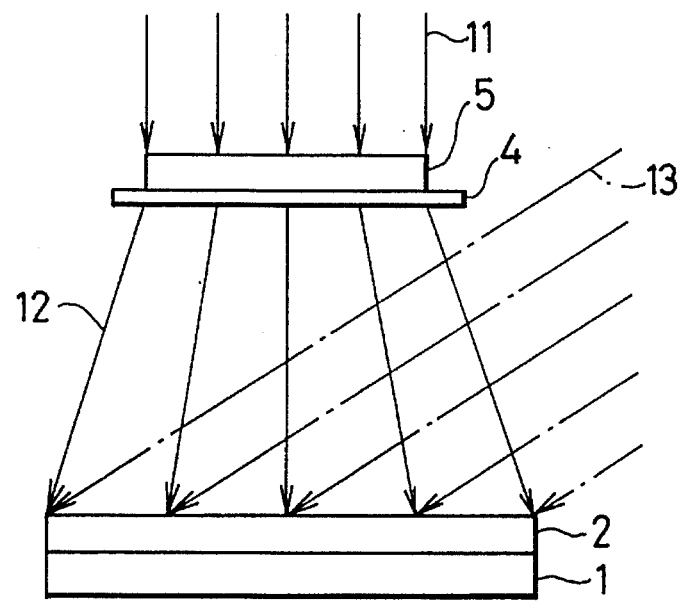
FIG. 2 illustrates an example of the photographing of a hologram according to the first embodiment of the present invention.

FIG. 2 illustrates an example of the manner by which photographs for the monochromatic-light reproduction type hologram are taken using the transmission-type originals. As shown in this drawing, a transmission-type original 4 of the divided pattern (A) comprised of a letter "O" and a diffusion plate 5 are superposingly disposed at the upper part side, and a support 1 coated with a photosensitive material 2 is disposed at the lower part side. Incident light 11 made incident from the upper part of the diffusion plate 5 is diffused at the diffusion plate 5 and selectively passes through the transmission-type original 4. The light having passed through the transmission-type original 4 is called object light 12. The object light 12 interferes with reference light 13 incident at twelve o'clock as viewed from the upper part of the support 1 and diagonally from the upper part as viewed from the side, and records interference fringes on the photosensitive material 2. This first-exposure time is set to be about 3 seconds.

Next, the original is replaced with a transmission-type original 4 of the divided pattern (B) comprised of a letter "K", and also the support 1 coated with the photosensitive material 2 is rotated by 90° around the center of the surface of the support. At the same time, like the first exposure, the object light 12 and the reference light 13 are incident for, e.g., 4 seconds to multiple-record interference fringes 4a and interference fringes 4b on the photosensitive material 2, the former corresponding to the letter "O" formed in the first exposure and the latter corresponding to the letter "K" whose directionality is different by 90° (see FIG. 3). The angle at which the support is rotated is not necessarily 90°, and the support may also be rotated at other angles as a matter of course. Alternatively, in place of the method in which the support is rotated, the reference light 13 in the second exposure may be made incident at three o'clock as viewed from the upper part of the support 1 and diagonally from the upper part as viewed from the side. In the present embodiment, the divided pattern (A) comprised of a letter "O" and the divided pattern (B) comprised of a letter "K" are multiple-recorded, which, however, may be so changed that more divided patterns with mutually different directionalities are multiple-recorded.

After such double exposure has been applied, the photosensitive material 2 is developed to prepare a master having a land-and-groove pattern 20 as shown in FIG. 4A.

Preparation of monochromatic-light reproduction type hologram

Next, using this master, a metal stamper is prepared by known electroforming.

More specifically, as shown in FIG. 4B, the master having the land-and-groove pattern 20 is subjected to vacuum deposition or electroless plating on its surface to form a conductive thin film 21 formed of gold or silver. Setting this conductive thin film 21 as an electrode, a coating layer 22 comprising nickel or the like is formed on the conductive thin film 21 by electroplating (see FIG. 4C), and then the coating layer 22 is peeled from the conductive thin film 21 to produce a metal stamper 25 as shown in FIG. 4D.

Using this metal stamper 25, a hologram label 6 is produced.

Figure 5:
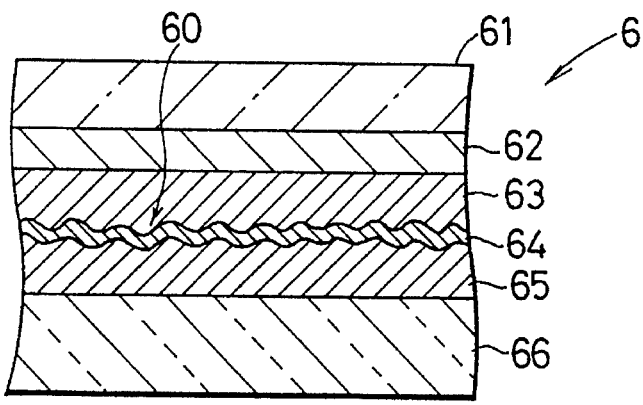
FIG. 5 illustrates the structure of a hologram label according to the first embodiment of the present invention.

More specifically, the hologram label 6 is mainly comprised of, as shown in FIG. 5, a sheet substrate 61, a releasable protective layer 62 provided on the sheet substrate 61 in a releasable state, a hologram layer 63 having a land-and-groove pattern 60 formed by pressing the metal stamper 25 with heating, a light reflecting layer 64 provided along the surface of the land-and-groove pattern 60, an adhesive layer 65 uniformly provided on the light reflecting layer 64, and a release sheet 66 laminated to the surface of the adhesive layer 65.

The sheet substrate 61 also has a function of protecting the hologram layer 63, and may be comprised of a resin film such as a polyester film or a polycarbonate film. Its thickness is set in the range of from about 50 to 100 µm.

The releasable protective layer 62 is comprised of a resin layer with a thickness of about 1 to 2 µm, formed by applying a coating material made from an acrylic resin or a mixture of an acrylic resin and a vinyl resin or the like, using a known process as exemplified by solvent coating such as bar coating, blade coating, air knife coating, gravure coating or roll coating, or screen printing, followed by drying.

As for the hologram layer 63, it is a resin layer with a thickness of 0.5 to 2 µm, formed by applying a coating material made from, e.g., an acrylic resin, a urethane resin, a cellulose acetate resin or a nitrocellulose resin, using the same coating process as used in the coating of the releasable protective layer, and having a land-and-groove pattern 60 comprised of a plurality of interference fringes formed by pressing the metal stamper 25 with heating.

The light reflecting layer 64 provided along the surface of the land-and-groove pattern 60 should preferably be comprised of a metal such as aluminum or tin having a high surface reflectance, and can be formed by subjecting the metal to a film forming process such as vacuum deposition, sputtering or ion plating. The layer may preferably be in a thickness of from about 300 to 1,000 angstroms. In the case when the light reflecting layer 64 is formed of the above metal, the resulting hologram is the hologram of a reflection type. The hologram of a light transmission type can be obtained when the metal is replaced with a transparent material having a larger refractive index than the material constituting the hologram layer.

Such a transparent material may include, for example, $Sb_2S_3$, $Fe_2O_3$, $TiO_2$, CdS, $CeO_2$, $PbCl_2$, CdO, $Sb_2O_3$, $Bi_2O_3$, ZnS, $WO_3$, SiO, $In_2O_3$, PbO, $Ta_2O_3$, ZnO, $CaO.SiO_2$, ZrO, $Cd_2O_3$ and $Al_2O_3$, and can be formed into a film on the hologram layer 63 by a film forming process such as EB deposition, vacuum deposition, sputtering, reactive sputtering or ion plating. This hologram of a light transmission type can also be used as a hologram of a reflection type.

The adhesive layer 65 is a resin layer with a thickness of from 0.5 to 2 µm, formed by, for example, applying a coating material mainly composed of an acrylic resin, a vinyl resin or the like by the coating process as described above, and is a layer made to have a stronger adhesion than the adhesion of the releasable protective layer 62.

From the hologram label 6 made up in this way, the release sheet 66, comprised of release paper or the like, is peeled off to lay the adhesive layer 65 bare. The label from which the release sheet has been removed is stuck to, e.g., a card (not shown) made of polyvinyl chloride, and also the sheet substrate 61 is peeled off to produce a monochromatic-light reproduction type hologram recorded article. Of course, as the card, a plastic card other than the vinyl chloride card may also be used.

In an experiment, laser light was made incident on the monochromatic-light reproduction type hologram thus formed to try obtaining a dead copy, but only part of the information pattern composed of letters "OK" was reproducible.

Image reproducing apparatus

An apparatus used to reproduce images from the monochromatic-light reproduction type hologram thus formed will be described below.

Figure 6:
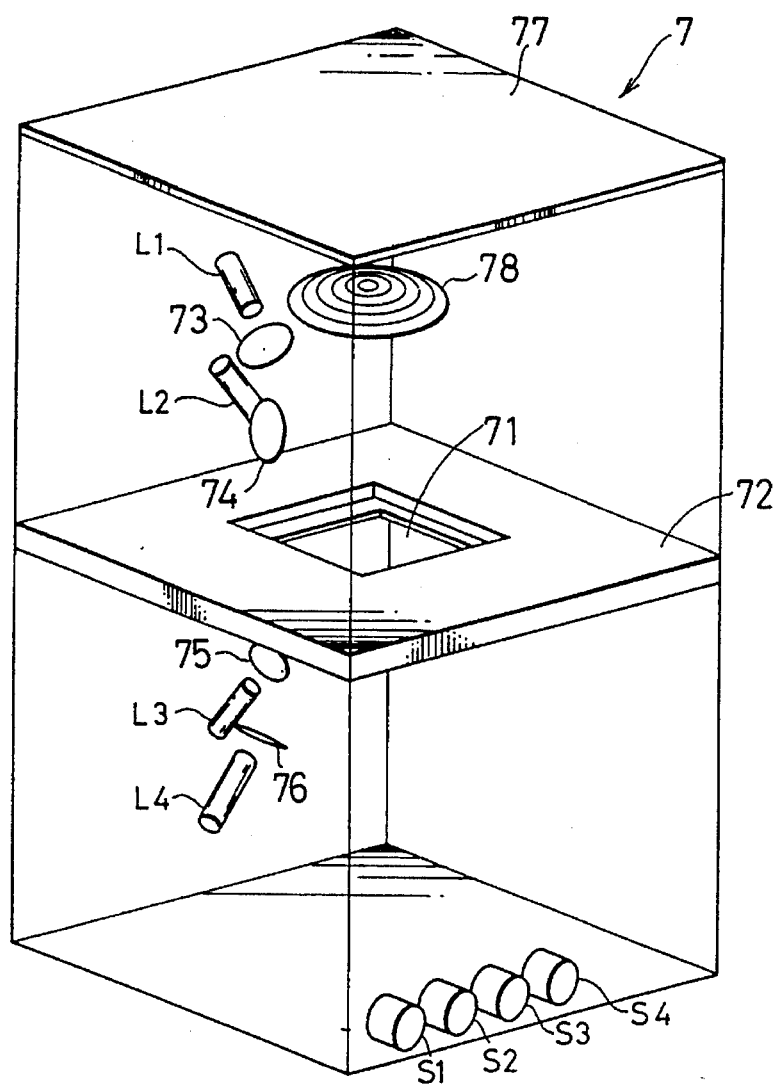
FIG. 6 is a prespective view to schematically illustrate an image reproducing apparatus according to the first embodiment of the present invention.
Figure 7:
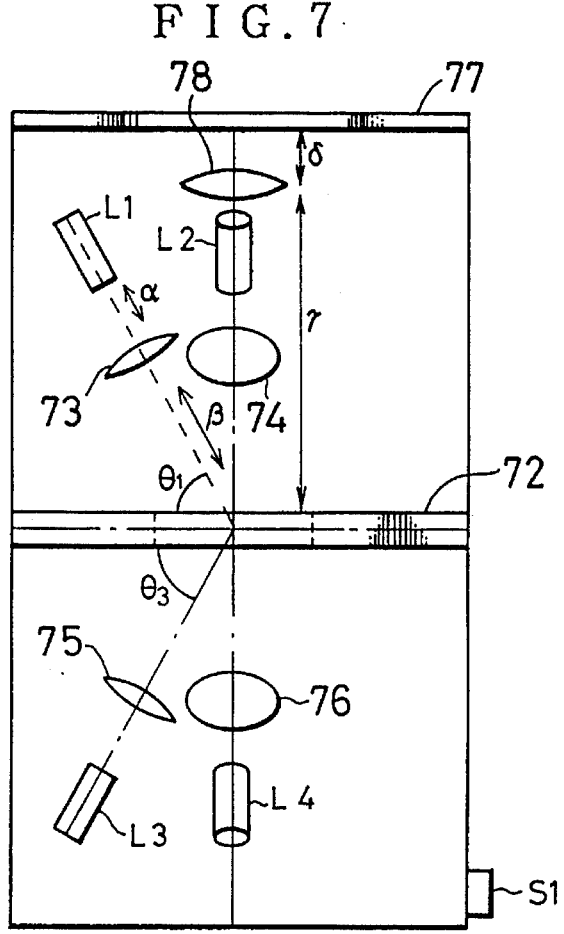
FIG. 7 is a side view of the image reproducing apparatus in the state one of side plates thereof is removed.
Figure 8:
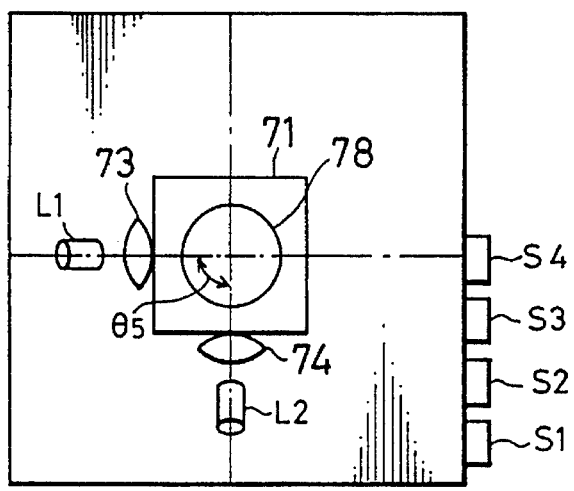
FIG. 8 is a plan view of the image reproducing apparatus in the state its screen is removed.

As shown in FIGS. 6 to 8, an image reproducing apparatus 7 is mainly comprised of a hologram setting plate 72 provided at its center with an opening 71 at which a hologram recorded article is to be set, four visible light laser beam sources L1, L2 and L3, L4 disposed respectively at the upper part and the lower part of the setting plate 72 located between them and provided so as to be on-off operable by means of switches S1 to S4 connected to a power source (not shown), lenses 73 to 76 through which the visible light laser beams produced from the visible light laser beam sources L1 to L4, respectively, are focused on a hologram recorded area of the hologram recorded article set at the setting plate, a screen 77 serving as an image forming means on which reproduced respective hologram images are projected, and a lens 78 through which the respective hologram images are formed as an image on the screen 77. The image reproducing apparatus also comprises four side plates that constitute side walls of the apparatus, at least one of which is so formed as to be openable when the hologram recorded article is set at the opening 71.

First, the four visible light laser beam sources L1 to L4 are sources from which, for example, 670 nm visible light laser beams are produced by actuating the power source (not shown). The visible light laser beam sources L1 and L2 are applied to the image reproduction of a reflection type hologram, and the visible light laser beam sources L3 and L4 are applied to the image reproduction of a light transmission type hologram. As the visible light laser beam sources, it is possible to use He—Ne visible light lasers having a peak wavelength of 633 nm. The number of the visible light laser beam sources is by no means limited to four, and a greater number of sources may be used as a matter of course.

The visible light laser beam source L1 is disposed on the upper side of the hologram setting plate 72 so that a visible light laser beam is produced, for example, from the direction of an axis X at $\theta_1$=60° (see FIGS. 7 and 8), and the visible light laser beam source L2 is also disposed on the upper side of the hologram setting plate 72 so that a visible light laser beam is produced, for example, along an axis Y at $\theta_2$ (not shown)=60° (see FIG. 8). Meanwhile, the visible light laser beam source L3 is disposed on the lower side of the hologram setting plate 72 so that a visible light laser beam is produced, for example, along an axis X at $\theta_3$=60° (see FIG. 7), and the visible light laser beam source L4 is also disposed on the lower side of the hologram setting plate 72 so that a visible light laser beam is produced, for example, along an axis Y at $\theta_4$ (not shown)=60°. A mechanism capable of changing and adjusting the irradiation angles $\theta_1$ to $\theta_4$ of the visible light laser beam sources L1 to L4, respectively, and the lenses 73 to 76 within the range of 0° to 90° is also provided so that all the visible light laser beams of the visible light laser beam sources L1 to L4 can be shed on the hologram setting plate 72. This is because all the angles $\theta_1$ to $\theta_4$ do not necessarily come to be 60° in accordance with the incident angle of reference light or incident light of object light used when photographs are taken to prepare the master, and other conditions at the time of photographing.

As shown in FIG. 8, an angle $\theta_5$ formed by the visible light laser beam source L1 and the visible light laser beam source L2 is set at 90°. This angle $\theta_5$ is so formed as to be in accordance with the angle formed by the interference fringes of the master having been subjected to double exposure (as previously described, the directionality of the interference fringe 4a and interference fringe 4b is made different by 90°).

Then, a plurality of hologram images reproduced from the hologram recorded area of the hologram recorded article set at the opening 71 of the hologram setting plate 72 are projected onto the screen 77. To visually recognize the reproduced image, it is preferable to view the image at a position above the screen or at any desired position. The screen 77 may preferably be made of a semi-transparent material such as ground glass. In place of the system wherein the reproduced image projected onto the screen 77 is visually read, the system may be so set up that the reproduced image (e.g., a bar code pattern) is read by a mechanical means such as an optical sensor.

The lenses 73 to 76 have the function of focusing the visible light laser beams produced from the visible light laser beam sources L1 to L4 and making them convergent on the hologram recorded area of the hologram recorded article. For example, convex lenses can be used. The visible light laser beams thus produced on is diffracted in the hologram recorded area, converged by the lens 78 and then focused on the screen 77 to form an image. Thus, an information pattern composed of a plurality of hologram images are reproduced.

When the conditions for photographing to prepare the master (e.g, conditions for exposure) are changed, the magnifying power of the lenses must be changed accordingly. Hence, in the present image reproducing apparatus, the lenses are provided so as to be variable in respect of, as shown in FIG. 7, the distance $\alpha$ between the visible light laser beam source L1 and the lens 73, the distance $\beta$ between the lens 73 and the hologram setting plate 72, the distance $\gamma$ between the hologram setting plate 72 and the lens 78 and the distance $\delta$ between the lens 78 and the screen 77 so that they can be adjusted in accordance with the type of the hologram recorded article set at the opening 71 of the hologram setting plate 72. A similar mechanism is also incorporated into the visible light laser beam sources L2, L3 and L4 other than the visible light laser beam source L1.

Figure 9:
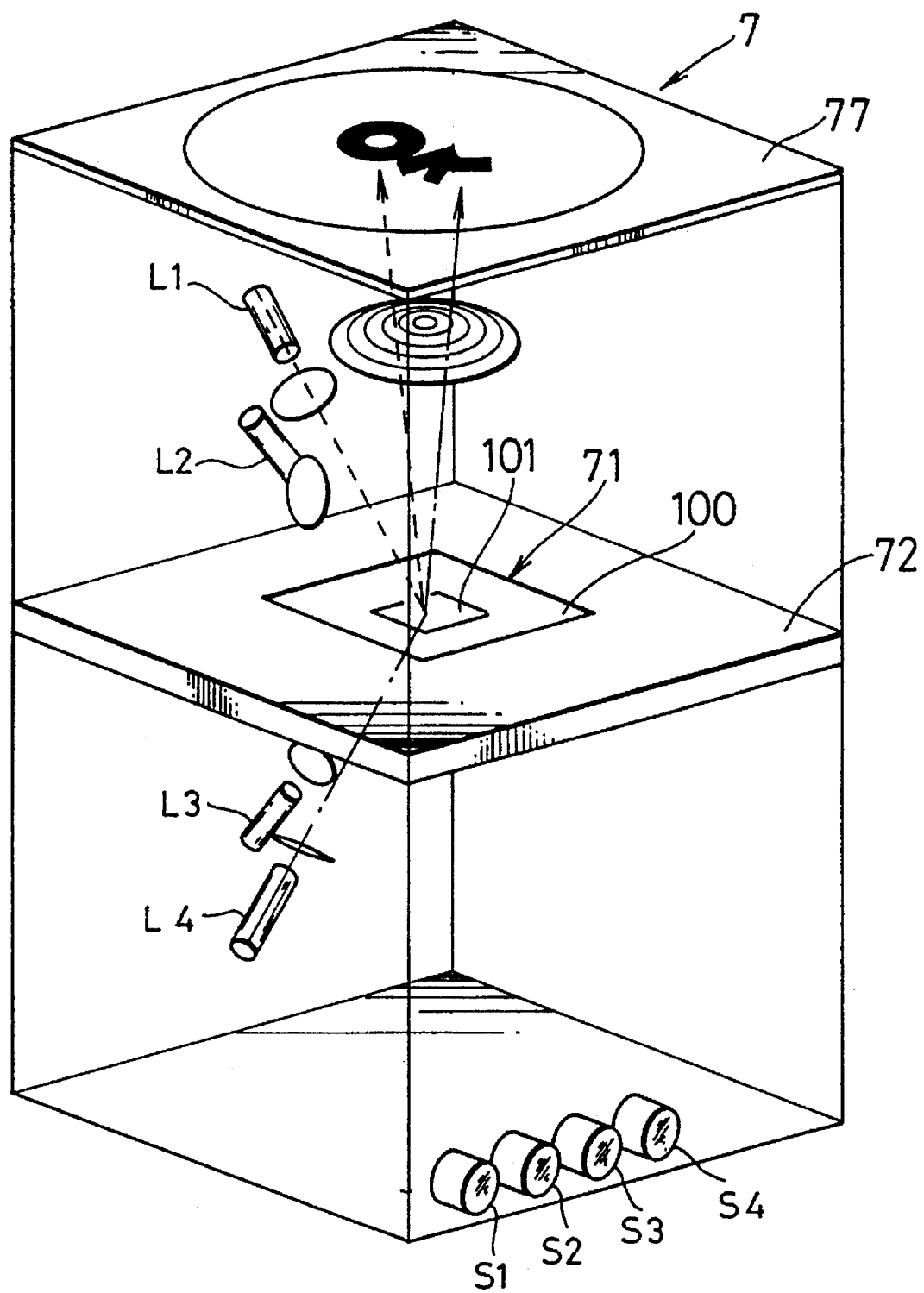
FIG. 9 is a schematic perspective view of an image reproducing apparatus in which a hologram recorded article has been set.

In an experiment, as shown in FIG. 9, a light transmission type hologram recorded article 100 in which the interference fringe 4a corresponding to a letter "O" and the interference fringe 4b corresponding to a letter "K" had been multiple-recorded was set at the opening 71 of the hologram setting plate 72, and switches S1 and S4 were operated to irradiate the hologram recorded area 101 of the hologram recorded article 100 with visible light laser beams from the visible light laser beam source L1 and the visible light laser beam source L4, respectively. As a result, letters "OK" comprised of a synthesis of the hologram image corresponding to the letter "O" and the hologram image corresponding to the letter "K" were reproduced at the center of the screen 77.

It was also attempted to make laser light incident on the hologram recorded area of the hologram recorded article 100 from one direction to obtain a dead copy. As a result, only part of the information pattern composed of the letters "OK" was reproducible as previously stated.

Hence, when the hologram recorded article according to this dead copy was set on the above image reproducing apparatus and irradiated with visible light laser beams from the visible light laser beam source L1 and the visible light laser beam source L4, none of letters "OK" were reproducible, and it was instantly seen that the hologram recorded article had been forged.

Figure 10:
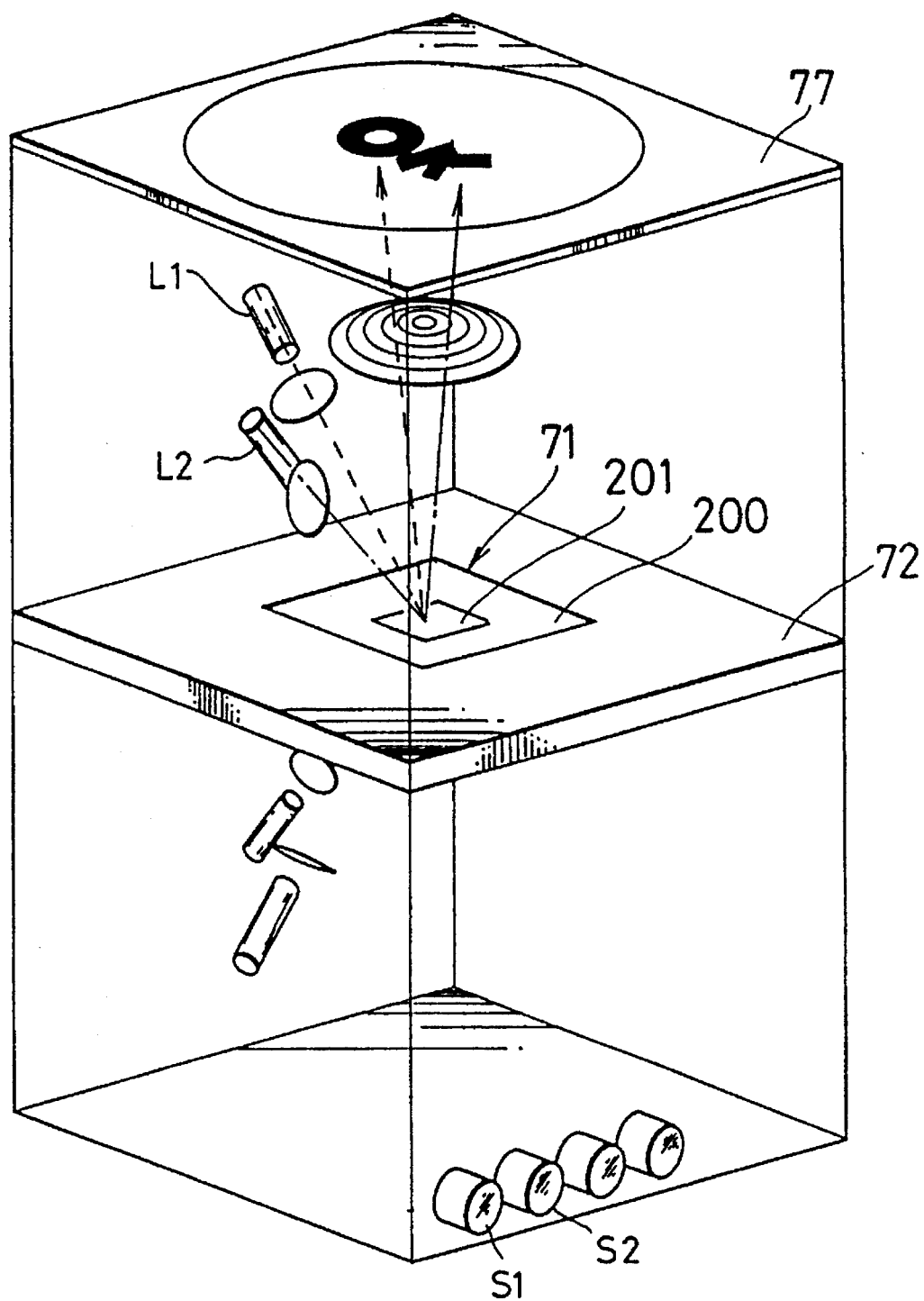
FIG. 10 is a schematic perspective view of an image reproducing apparatus in which a hologram recorded article has been set.

Meanwhile, as shown in FIG. 10, a reflection type hologram recorded article 200 in which the same interference fringes as the above had been multiple-recorded was set at the opening 71 of the hologram setting plate 72, and switches S1 and S2 were operated to irradiate the hologram recorded area 201 of the hologram recorded article 200 with visible light laser beams from the visible light laser beam source L1 and the visible light laser beam source L2, respectively. As a result, letters "OK" comprised of a synthesis of the hologram image corresponding to the letter "O" and the hologram image corresponding to the letter "K" were reproduced at the center of the screen 77.

SECOND EMBODIMENT

Figure 11:
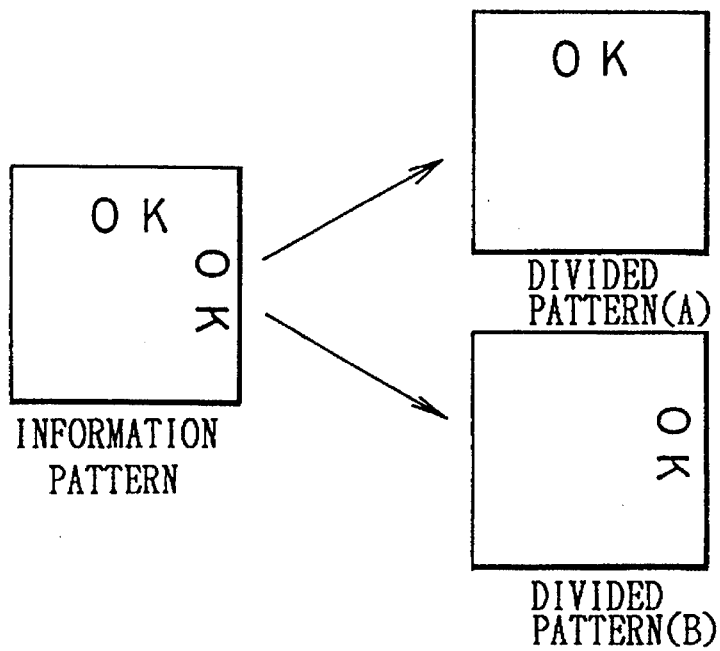
FIG. 11 illustrates the relationship between an information pattern and its divided patterns according to a second embodiment of the present invention.
Figure 12:
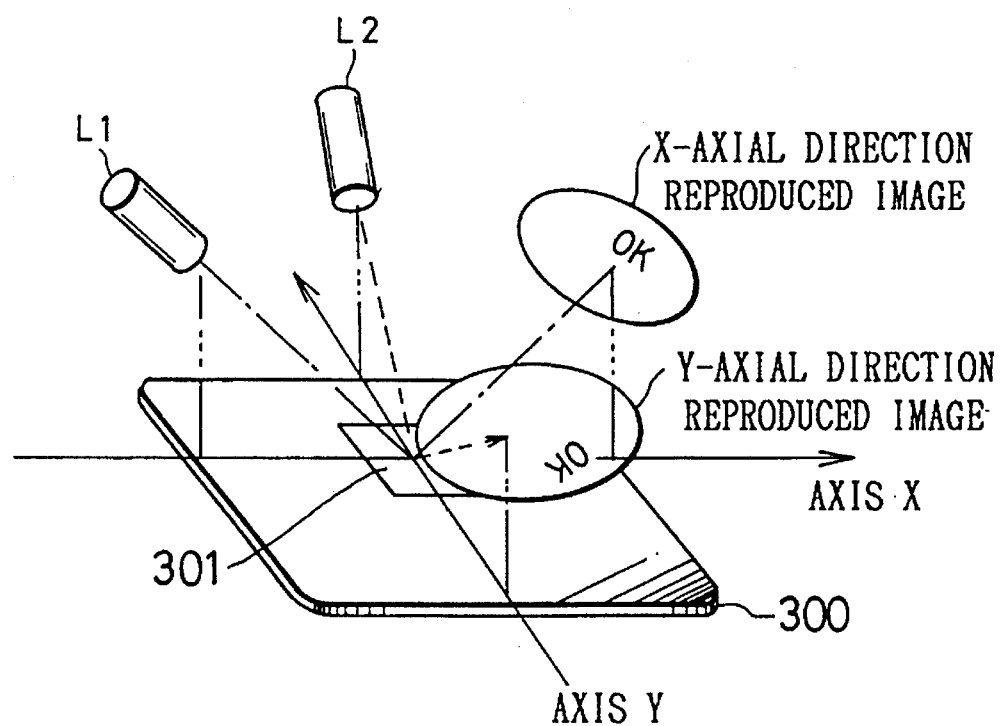
FIG. 12 illustrates a method of image reproduction from a hologram according to the second embodiment of the present invention.

FIG. 11 diagrammatically illustrates the relationship between two information patterns (two patterns comprised of two sets of letters "OK" provided in the direction falling at right angles each other) and their divided patterns (pattern A comprised of one set of letters "OK" and pattern B comprised of the other set of letters "OK"). In the present embodiment, the information patterns are divided into two patterns A and B to produce a transmission original, and a master is also prepared under the same conditions as in the first embodiment. Using the master, a reflection type, monochromatic-light reproduction type hologram recorded article 300 as shown in FIG. 12 is produced.

Figure 13:
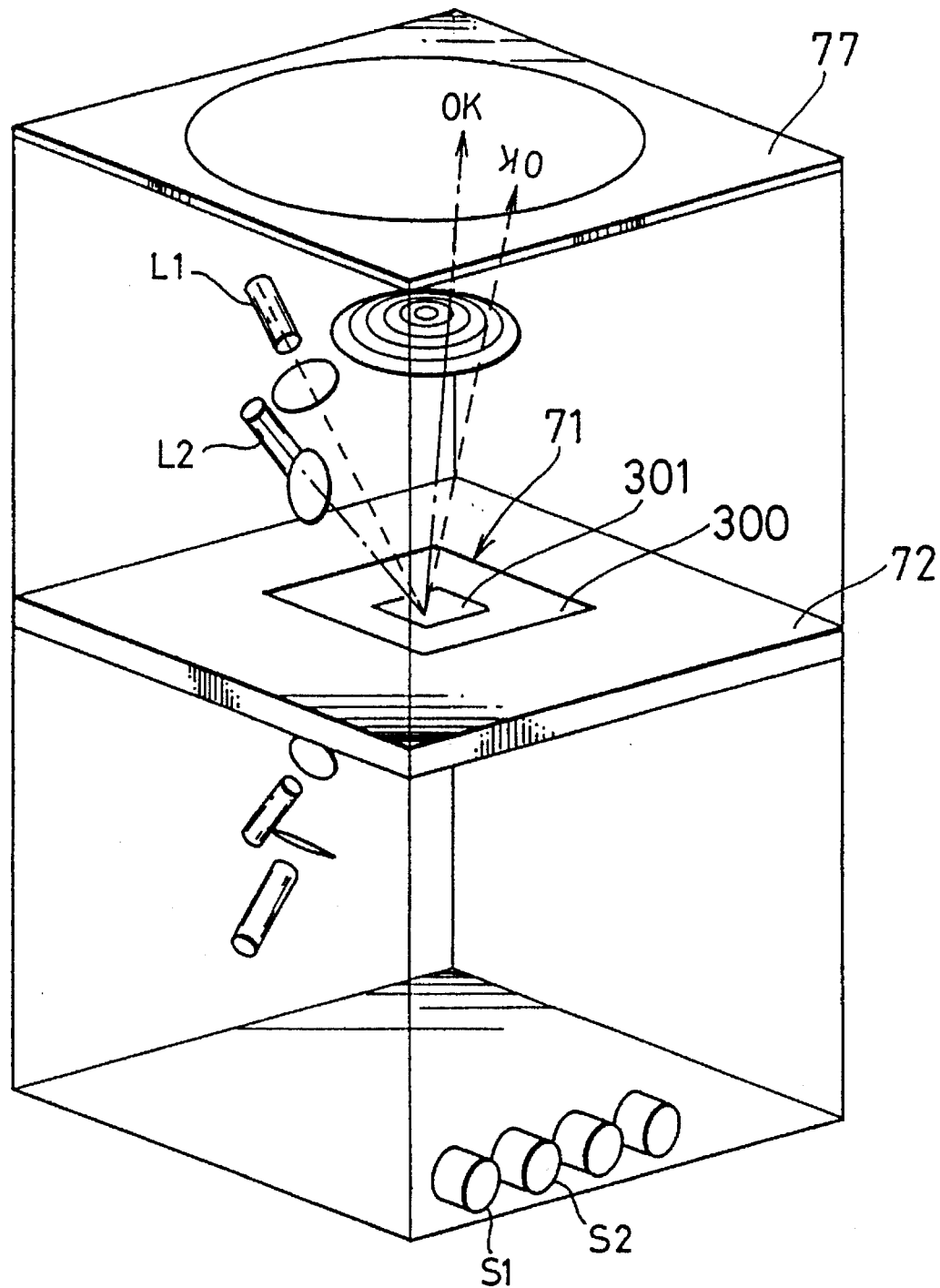
FIG. 13 is a schematic perspective view of an image reproducing apparatus in which a hologram recorded article has been set, according to the second embodiment of the present invention.

In an experiment, as shown in FIG. 13, this hologram recorded article 300 was set at the opening 71 of the hologram setting plate 72, and switches S1 and S2 were operated to irradiate the hologram recorded area 301 of the hologram recorded article 300 with visible light laser beams from the visible light laser beam source L1 and the visible light laser beam source L2, respectively. As a result, two sets of information patterns respectively comprised of letters "OK" in the directions of an axis X and an axis Y shown in FIG. 12 were reproduced on the screen 77.

The hologram recorded area was also irradiated separately with the visible light laser beam sources L1 and L2. As a result, the individual information patterns comprised of the letters "OK" recorded correspondingly to the respective directions were separately reproduced.

It was also attempted to make laser light incident on the hologram recorded area of the hologram recorded article 300 from one direction to obtain a dead copy. As a result, only one set of the information patterns comprised of the letters "OK" was reproducible.

Hence, when the hologram recorded article according to this dead copy was set on the above image reproducing apparatus and irradiated with visible light laser beams from the visible light laser beam source L1 and the visible light laser beam source L2, none of the other set of letters "OK" were reproducible, and it was instantly seen that the hologram recorded article had been forged.

THIRD EMBODIMENT

Figure 14:
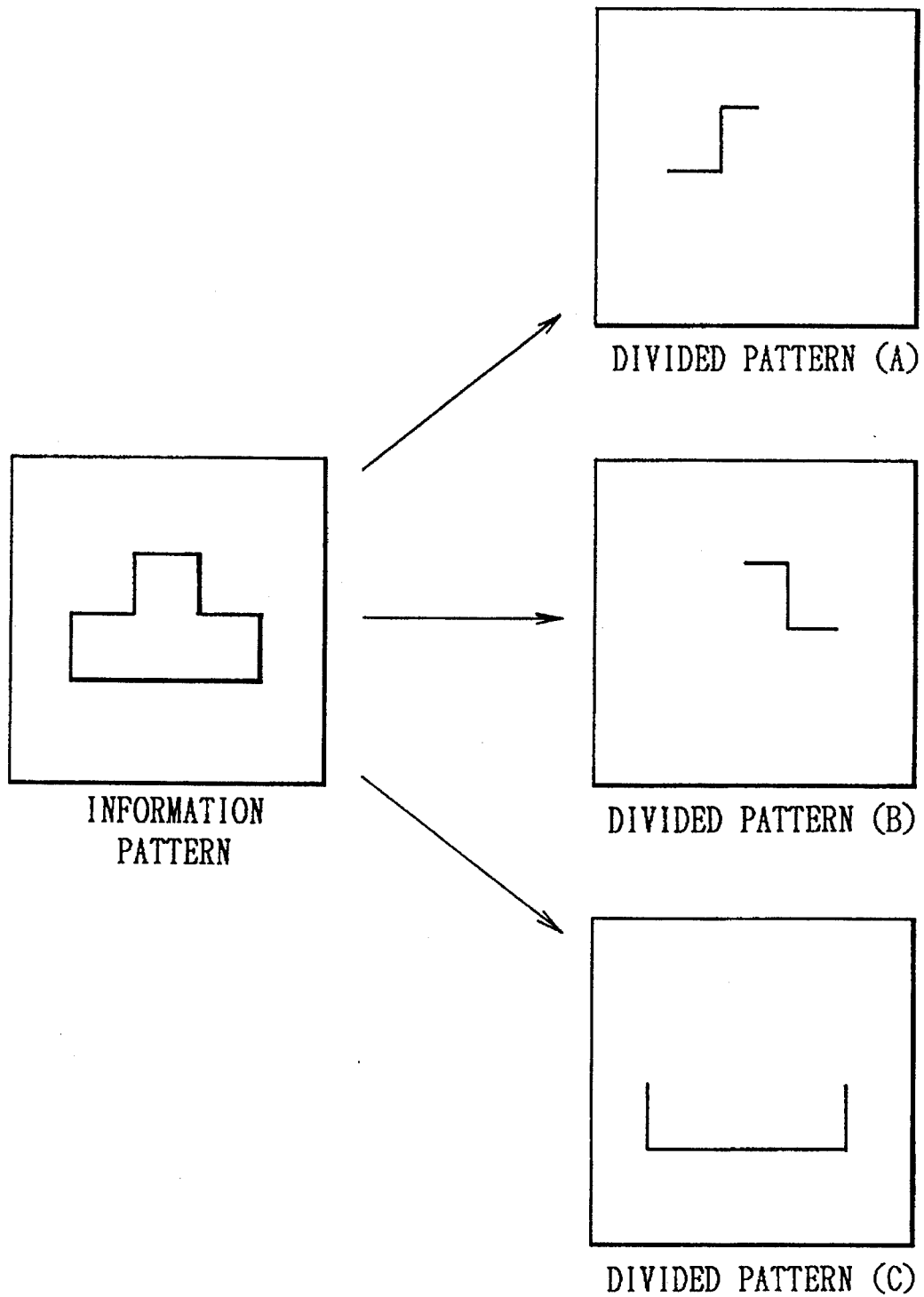
FIG. 14 illustrates the relationship between an information pattern and its divided patterns according to a third embodiment of the present invention.

FIG. 14 diagrammatically illustrates the relationship between a single information pattern (composed of "凸", a chinese character which means convexity and represents the first character of the Japanese naming of TOPPAN PRINTING CO., LTD.) and its divided patterns. In the present embodiment, the information pattern is divided into three patterns A, B and C to produce transmission-type originals.

Figure 15:
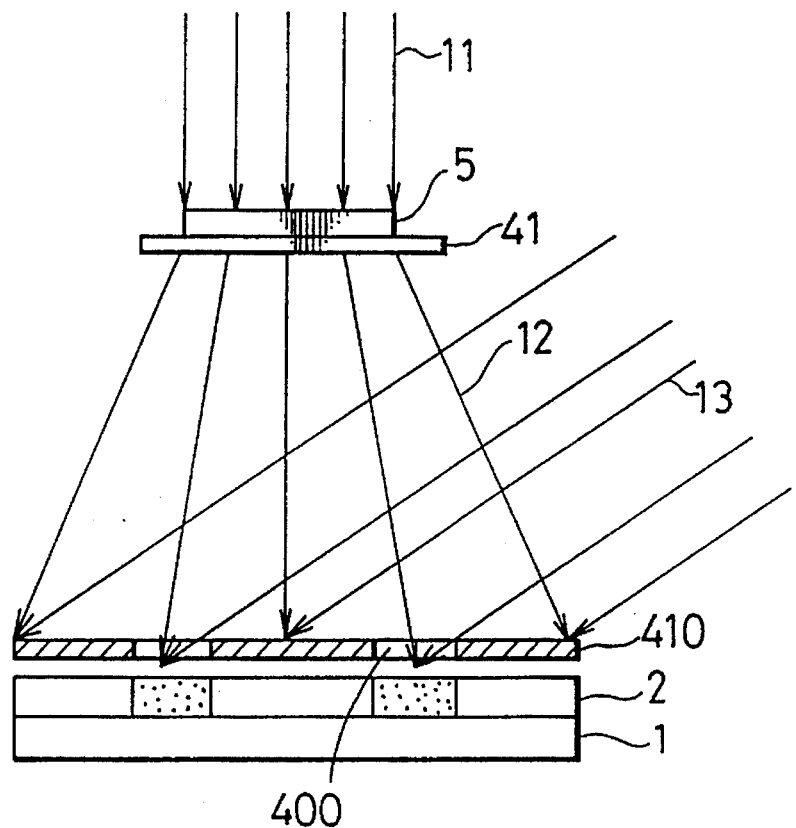
FIG. 15 illustrates an example of the photographing of a hologram according to the third embodiment of the present invention.

FIG. 15 illustrates an example of the manner by which photographs for the hologram are taken using the transmission-type originals. As shown in this drawing, a transmission-type original 41 of the divided pattern (A) and a diffusion plate 5 are superposingly disposed at the upper part side, and a mask 410 for the divided pattern (A) and a support 1 coated with a photosensitive material 2 are superposingly disposed at the lower part side. Incident light 11 made incident from the upper part of the diffusion plate 5 is diffused at the diffusion plate 5 and selectively passes through the transmission-type original 41. The object light 12 interferes with reference light 13 produced at three o'clock as viewed from the upper part of the support 1 and diagonally from the upper part as viewed from the side, and records interference fringes on the photosensitive material 2.

Figure 16:
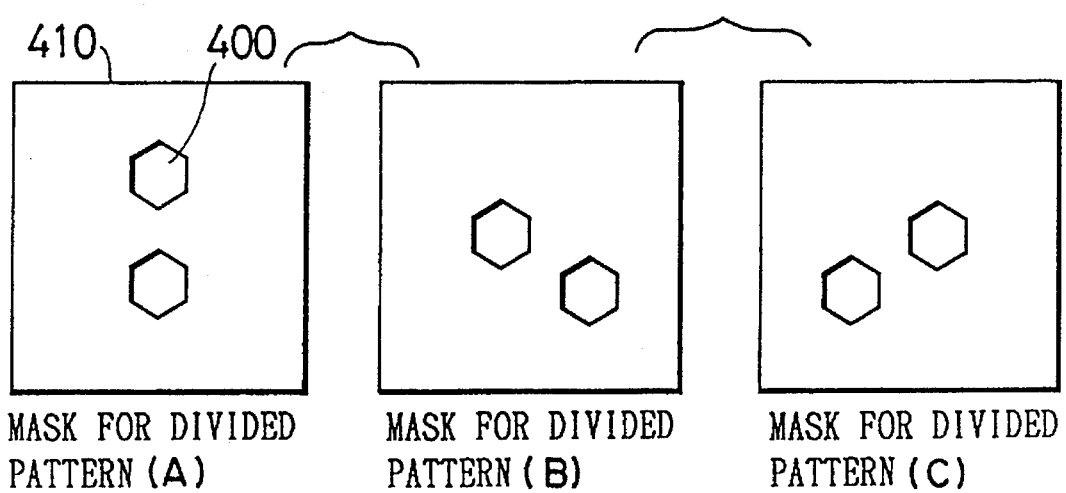
FIG. 16 is a plan view of masks for divided patterns used in the third embodiment of the present invention.

Masks for the divided patterns used in the photographing are shown in FIG. 16. Since the masks for the divided patterns must be in the same number as the number in which the information pattern is divided, three masks are made ready in the present embodiment. Each mask has two hexagonal openings 400, each of which corresponds to one divided region (the divided region formed in the hologram recorded area after a hologram has been completed). Each opening 400 (a divided region) of the hexagonal openings has such a size that it is inscribed in a circle of 0.2 mm diameter. As a matter of course, the shape and number of the openings 400 are by no means limited to those shown in FIG. 16.

Next, the transmission-type original is replaced with an original of the divided pattern (B), and the mask is also replaced with a mask for the divided pattern (B). Thereafter, the reference light is shed at one o'clock to similarly record interference fringes on the photosensitive material at its part corresponding to the opening of the mask for the divided pattern (B).

Finally, the transmission-type original is replaced with an original of the divided pattern (C), and the mask is also replaced with a mask for the divided pattern (C). Thereafter, the reference light is shed at five o'clock to record interference fringes on the photosensitive material at its part corresponding to the opening of the mask for the divided pattern (C). Then, the photosensitive material 2 in which the respective interference fringes have been recorded is developed to prepare a master having a land-and-groove pattern in the same manner as in the first embodiment.

As the photographing optical system, any known system can be used, provided that the size of transmission-type originals and the incident angles of reference light must be designed and adjusted by calculation since all the divided patterns reproduced must be in the same size and at the same position.

Figure 17:
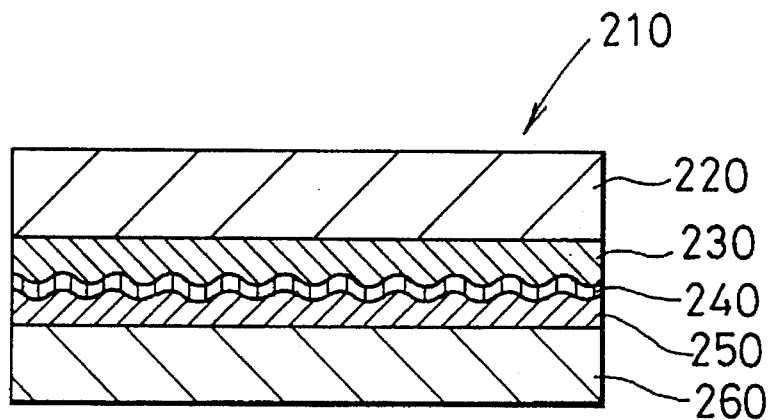
FIG. 17 illustrates the structure of a hologram label according to the third embodiment of the present invention.

Next, using this master, a metal stamper is prepared in the same manner as in the first embodiment, and using this metal stamper a hologram label 210 as shown in FIG. 17 is produced.

More specifically, the hologram label 210 is mainly comprised of, as shown in FIG. 17, a support film 220 comprising a resin film such as polyester film, a hologram layer 230 provided on the support film 220, comprising an acrylic resin and having a land-and-groove pattern formed by pressing the metal stamper with heating, a light reflecting layer 240 provided along the land-and-groove surface of the hologram layer 230, an adhesive layer 250 comprising a vinyl resin, formed on the light reflecting layer 240 by gravure coating, and a release paper 260 releasably provided on the adhesive layer 250, and is finished in the shape of a label by punching.

Figure 18:
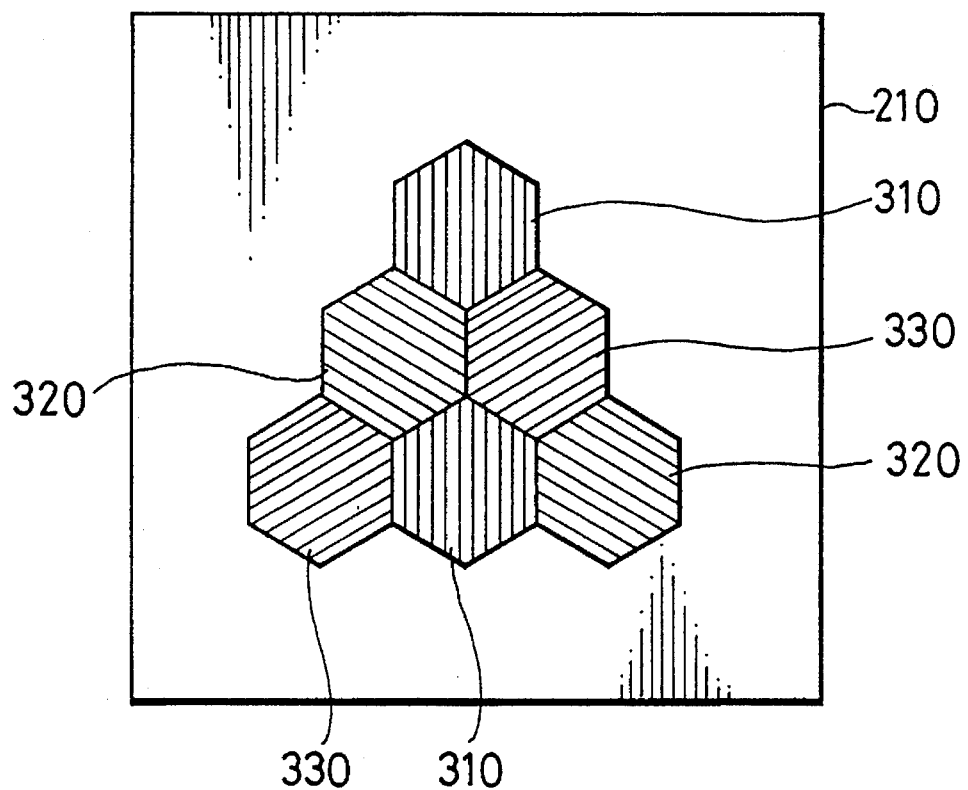
FIG. 18 is a plan view of the hologram label according to the third embodiment of the present invention.

FIG. 18 is a plan view of the hologram label according to the present embodiment.

This hologram label 210 has on the same plane a recorded area divided into six regions. The divided pattern (A), the divided pattern (B), and the divided pattern (C) are recorded in two divided regions 310, two divided regions 320 and two divided regions 330, respectively. The patterns in the respective sets of divided regions are different from one another in the directionality of interference fringes.

In this hologram label 210, its recorded area is divided into three sets of regions as described above, and also, in the respective divided regions 310 to 330, the three divided patterns (A) to (C) different from one another in the directionality of interference fringes are separately recorded. Hence, when information patterns are reproduced, the visible light laser beams must be made incident from respectively different directions (at seven o'clock, nine o'clock and eleven o'clock in the present embodiment).

Figure 19:
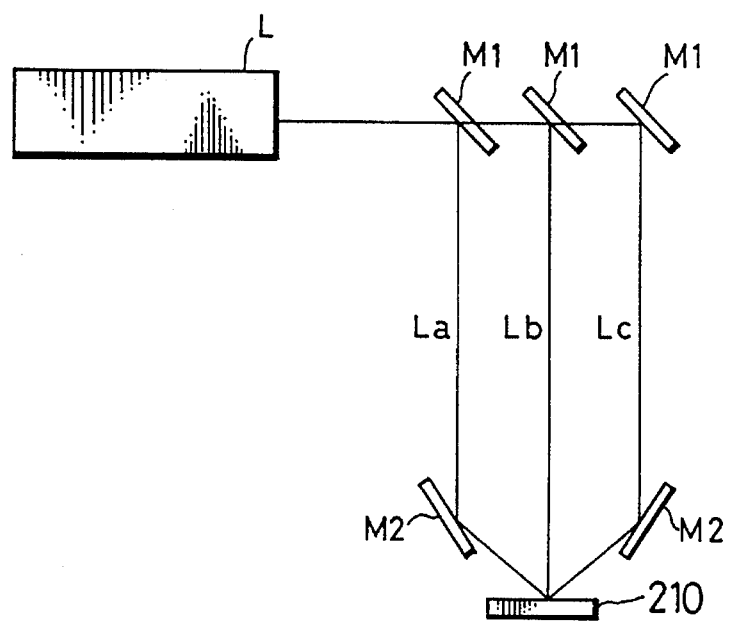
FIG. 19 illustrates the construction of a laser light source for visible light, incorporated into a reproducing apparatus used in the third embodiment of the present invention.

Accordingly, the image reproducing apparatus used in this embodiment is a little different from the image reproducing apparatus used in the first embodiment, and is incorporated with a visible light laser beam source L (a He—Ne visible light laser having a peak wavelength of 633 nm) as shown in FIG. 19. More specifically, this image reproducing apparatus is provided with the visible light laser beam source L, three mirrors M1 arranged on the light path of the visible light laser beam source L and capable of separating into three laser beams the visible light laser beams produced from the visible light laser beam source L and reflecting the separated laser beams in the direction of the hologram label 210, and two mirrors M2 arranged on the light paths of separated two laser beams and capable of changing the light paths of the laser beams to adjust their respective incident angles on the recorded area of the hologram label 210, where three visible light laser beams La, Lb and Lc are so made as to be simultaneously incident on the recorded area at seven o'clock, nine o'clock and eleven o'clock.

Figure 20:
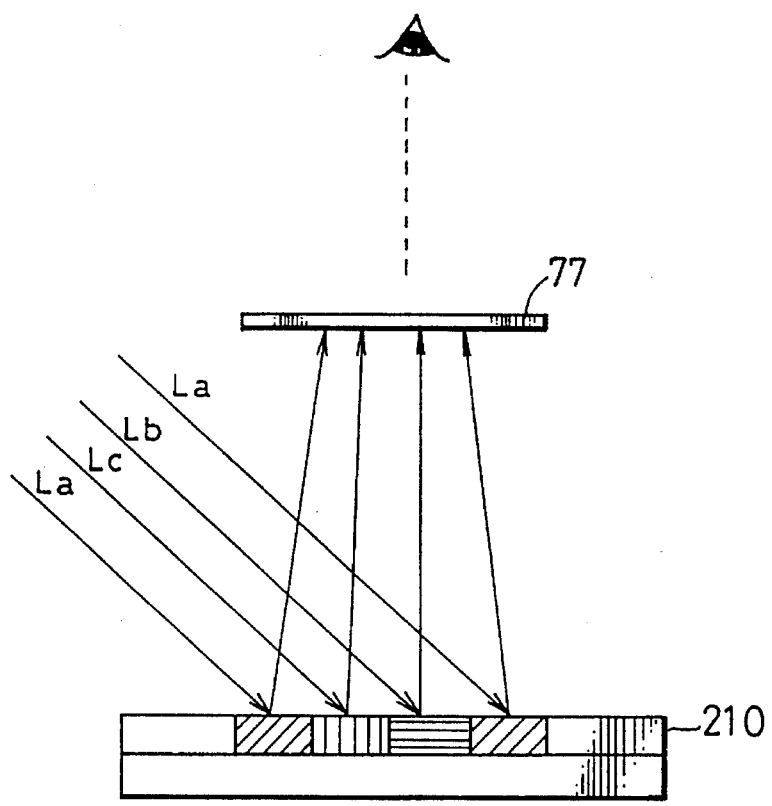
FIG. 20 illustrates a method of image reproduction from a hologram label according to the third embodiment of the present invention.

Then, as shown in FIGS. 20 to 21, the visible light laser beam made incident at nine o'clock (Lb) is reflected upward on the divided region 310 in which the divided pattern (A) has been recorded, and the divided pattern (A) is reproduced on the screen 77, At the same time, the visible light laser beam made incident at seven o'clock (La) is reflected upward on the divided region 320 in which the divided pattern (B) has been recorded, and the divided pattern (B) is reproduced on the screen 77. Also, the visible light laser beam made incident at eleven o'clock (Lc) is reflected upward on the divided region 330 in which the divided pattern (C) has been recorded, and the divided pattern (C) is reproduced on the screen 77. Thus, these divided patterns (A) to (C) are synthesized and the information pattern composed of the character "凸" is reproduced.

In an experiment, it was attempted to make laser light incident on the hologram recorded area of the hologram label 210 from one direction to obtain a dead copy. As a result, only part of the information pattern composed of the character "凸" was reproducible .

Hence, when the hologram recorded article according to this dead copy was set on the above image reproducing apparatus and simultaneously irradiated with three visible light laser beams from the visible light laser beam source L, none of the character "凸" was reproducible, and it was instantly seen that the hologram recorded article had been forged.

What is claimed is:

1. An apparatus for reproducing a hologram image from a light transmission monochromatic-light reproduction type hologram, comprising;

a holding means for setting a light transmission monochromatic-light reproduction type hologram recorded article at a given position;

a plurality of upper-side monochromatic light irradiation means provided above the holding means and by which a hologram recorded area of the monochromatic-light reproduction type hologram recorded article set on the given position is irradiated with monochromatic light rays at given angles to reproduce by reflected diffracted light a hologram image having a first identity information function;

a plurality of lower-side monochromatic light irradiation means provided below the holding means and by which a hologram recorded area of the monochromatic-light reproduction type hologram recorded article set on the given position is irradiated with monochromatic light rays at given angles to reproduce by transmitted diffracted light a hologram image having a second identity information function;

said hologram recorded area being an area in which a plurality of hologram images different from each other in the directionality of interference fringes are recorded, and being irradiated with said monochromatic light rays at given angles corresponding to the directionality of interference fringes of the recorded respective hologram images; and an image forming screen on which the hologram image reproduced by the reflected diffracted light and the hologram image reproduced by the transmitted diffracted light are synthesized to reproduce a single information pattern having a third identity information function different from said first identity information function and said second identity information function and substantially infeasible for a dead copy.

* * * * *